United States Patent
Suzuki (10) Patent No.: US 8,188,368 B2
(45) Date of Patent: May 29, 2012

(54) PROTECTOR FOR WIRE HARNESS

(75) Inventor: Takashi Suzuki, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 214 days.

(21) Appl. No.: 12/682,054

(22) PCT Filed: Feb. 12, 2008

(86) PCT No.: PCT/JP2008/052253
§ 371 (c)(1),
(2), (4) Date: Apr. 8, 2010

(87) PCT Pub. No.: WO2009/047921
PCT Pub. Date: Apr. 16, 2009

(65) Prior Publication Data
US 2010/0236826 A1    Sep. 23, 2010

(30) Foreign Application Priority Data

Oct. 11, 2007   (JP) ................................. 2007-265833

(51) Int. Cl.
*H02G 3/04* (2006.01)
(52) U.S. Cl. ............. 174/72 A; 174/68.3; 174/101; 174/97; 174/98; 439/207; 248/49
(58) Field of Classification Search ............. 174/72 A, 174/72 C, 68.3, 69, 97, 98, 101; 439/207, 439/447; 138/162; 248/49; 296/152
See application file for complete search history.

(56) References Cited

U.S. PATENT DOCUMENTS

| | | | | |
|---|---|---|---|---|
| 4,951,716 A | * | 8/1990 | Tsunoda et al. | 138/162 |
| 6,861,589 B2 | * | 3/2005 | Katsumata et al. | 174/68.3 |
| 7,906,728 B2 | * | 3/2011 | Sakata et al. | 174/72 A |
| 2005/0118852 A1 | | 6/2005 | Daito | |
| 2006/0090920 A1 | | 5/2006 | Fujita | |

FOREIGN PATENT DOCUMENTS

| | | |
|---|---|---|
| JP | 2005-168131 | 6/2005 |
| JP | 2006-117122 | 5/2006 |
| JP | 2006-246663 | 9/2006 |
| JP | 2007-159261 | 6/2007 |

* cited by examiner

*Primary Examiner* — Dhirubhai R Patel
(74) *Attorney, Agent, or Firm* — Gerald E. Hespos; Michael J. Porco (57) ABSTRACT

A protector for a wire harness has a U-shaped main body casing for receiving a wire harness and a lid for closing an opening in the main body casing. The main body casing has opposite longitudinal ends with inlet and outlet portions for passing the wire harness. The inlet and outlet portions define tape-supports to be secured to the wire harness by tape-wrapping. A tape-support also is provided on a longitudinal end of the lid at a side of at least one of the inlet and outlet portions. The tape-support of the lid is slanted to contact an outer surface of the wire harness. The wire harness is disposed between the tape-supports of the lid and the main body casing. A tape is wound around the tape-supports of the main body casing and the lid to secure these portions to the wire harness.

3 Claims, 13 Drawing Sheets

his invention relates to a protector for a wire harness, and more particularly relates to a protector adapted to be attached to an outer peripheral surface of the wire harness to be arranged in a motor vehicle and secured to the wire harness by a tape-wrapping manner.

PROTECTOR FOR WIRE HARNESS

BACKGROUND OF THE INVENTION

1. Field of the Invention

This invention relates to a protector for a wire harness, and more particularly relates to a protector adapted to be attached to an outer peripheral surface of the wire harness to be arranged in a motor vehicle and secured to the wire harness by a tape-wrapping manner.

2. Description of the Related Art

Heretofore, a wire harness to be arranged in a motor vehicle is often disposed at a place where an interfering member is positioned near an arrangement path of the wire harness or a place where the arrangement path of the wire harness must be restricted. A protector made of a resin material is attached to the outer peripheral surface of the wire harness at such place so as to protect the wire harness from the interfering member and to restrict the arrangement path of the wire harness.

Figure 15:
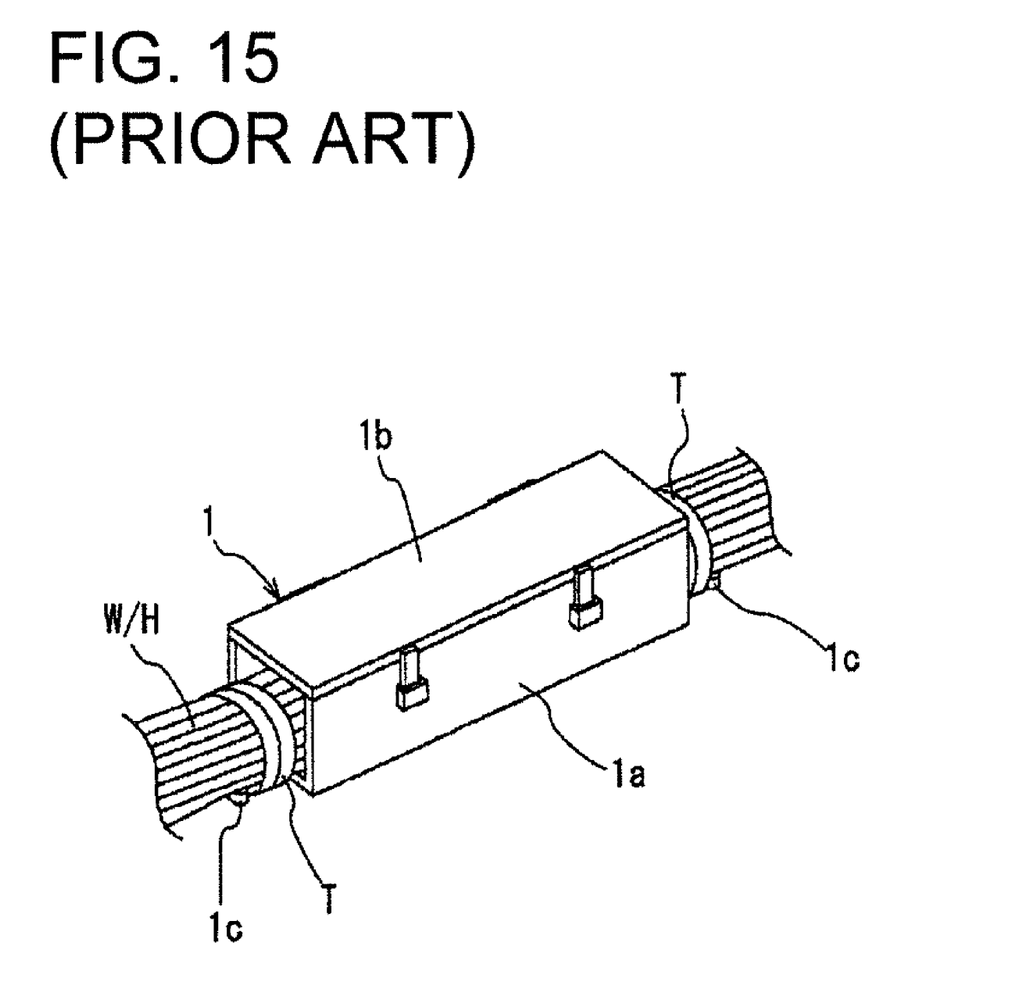
FIG. 15 is a perspective view of a prior art protector for a wire harness.

The present applicant has disclosed such a kind of protector in JP 2006-246663 A. As shown in FIG. 15, a protector 1 includes a main body casing 1a having a U-shaped cross section, and a lid 1b for closing an upper opening in the main body casing 1a. Longitudinal opposite ends of the main body casing 1a define inlet and outlet portions for a wire harness W/H. A tape-support tongue piece 1c extends from each of the longitudinal opposite ends of the main body casing 1a. A tape T is wound around the wire harness W/H together with the tape-support tongue pieces 1c to secure the protector 1 to the wire harness W/H by a tape-wrapping manner.

Thus, since the tape-support tongue pieces 1c of the protector 1 is secured to the wire harness W/H by the tape-wrapping manner, the protector 1 can be attached to the wire harness W/H without displacing the protector 1 on the wire harness W/H.

In the above protector 1, the tape-support tongue pieces 1c are provided on only the main body casing 1a in order to surely secure the protector 1 to the wire harness W/H and the tape-support tongue pieces 1c are formed into flat plate-like configuration to increase a contact area between the wire harness W/H and the tape T at a tape-wrapping position.

Consequently, the wire harness W/H is protected from an external interfering member at only a lower side provided with the tape-support tongue pieces 1c on the tape-wrapping position. If a sharp external interfering member is disposed near the tape-wrapping position, for example an upper side position, it is impossible to protect the wire harness W/H only by the tape-wrapping section and there will be a possibility that the wire harness may be broken on account of contact with the external interfering member.

If the main body casing 1a and lid 1b are extended to the tape-wrapping position in order to solve the above problem, the main body casing 1a and lid 1b can surround and protect a whole outer peripheral surface of the wire harness W/H. However, there is a case where an upper wall of the lid 1b cannot be extended on account of a space or an arranging work at a protector arrangement position.

SUMMARY OF THE INVENTION

In view of the above problems, an object of the present invention is to provide a protector that can protect a wire harness even at the tape-wrapping position between the wire harness and the protector.

In order to solve the above problems, the present invention is directed to a protector-attaching structure in which a wire harness to be arranged in a motor vehicle is inserted into a protector comprising a main body casing having a U-shaped cross section and a lid for closing an opening in said main body casing. The main body casing of the protector is provided on longitudinal opposite ends with inlet and outlet portions for the wire harness. The inlet and outlet portions are adapted to define tape-support portions that receive the wire harness and are wound by a tape to be secured to the wire harness. The lid is provided through a thin hinge portion on a longitudinal end with a tape-support portion at a side of at least one of the inlet and outlet portions. The tape-support portion of the lid is inclined about the thin hinge portion so that the tape-support portion of the lid can contact an outer peripheral surface of the wire harness. The tape-support portion of the lid is provided on a proximal end part coupled to the thin hinge portion with a reinforcement thick portion and on a distal end part with a flexible thin portion. The wire harness is arranged along the tape-support portions of the main body casing and is wrapped by the tape. The tape-support portion of the lid is inclined onto and is contacted with an outer peripheral surface of the tape wound around the wire harness. A further tape is wound around the outer peripheral surface of the previously wound tape including an outer peripheral surface of the tape-support portion of the lid to secure the tape-support portions of the main body casing and the lid to the wire harness.

According to the protector for the wire harness constructed above, since firstly the wire harness drawn out from the distal end opening is secured to the tape-support portion of the main body casing by winding the tape thereon, and since the tape-support portion of the lid is slanted toward the wire harness and is wrapped by the tape, it is possible to protect the wire harness from the external interfering member outside the lid and to dispose the lid without being interfered with the external interfering member.

Thus, it is possible to protect the wire harness from the external interfering member even at the tape-wrapping position for securing the protector to the wire harness, to shorten the lid so that it does not interfere with the external interfering member, and to downsize the protector. Accordingly, the downsizing of the protector can enhance a workability of arranging the wire harness on a vehicle body and can facilitate to accommodate the wire harness with the protector in a carrying container.

Since the tape-support portion of the lid is flexible or the tape-support portion of the lid extends through a thin hinge portion from the lid, it is possible to incline the tape-support portion toward the wire harness drawn out from the main body casing at a given angle and to bring the tape-support portion of the lid into contact with the outer peripheral surface of the wire harness. Consequently, it is possible to secure the protector to the wire harness having a small diameter as well as a large diameter by the tape-wrapping manner while disposing the tape-support portion of the lid on the wire harness.

The tape-support portions of the lid and the main body casing are disposed on the upper and lower sides of the wire harness. If the main body casing is secured to the wire harness by the tape-wrapping manner before the lid is mounted on the main body casing, and then if the lid is mounted on the main body casing and the tape-support portion of the lid is secured to the wire harness by a further tape-wrapping manner, it is possible to surely secure the protector to the wire harness without decreasing a contact area between the wire harness and the tape.

Preferably, the tape-support portion of the lid is formed into a tape-support tongue piece having a flat plate-like cross section, an L-shaped cross section, a U-shaped cross section, or an arcuate cross section in a direction perpendicular to the longitudinal direction.

If the tape-support portion of the lid is formed into the flat plate-like tape-support tongue piece, it is easy to mount the tape support tongue piece of the lid onto the outer peripheral surface of the wire harness. Also, if the tape-support portion of the lid is formed into the L-shaped cross section, the U-shaped cross section, or the arcuate cross section, it is possible for the tape-wrapping part to protect the side surfaces of the wire harness as well as the upper side surface of the wire harness from the external interfering member.

Preferably, the tape-support portion of the main body casing is opposed to the tape-support portion of the lid and has an L-shaped cross section.

Since the tape-support portion of the main body casing at the tape-wrapping position is formed into not the flat plate-like configuration in the prior art but the L-shaped cross section, it is possible to protect one side surface of the wire harness as well as the lower side surface of the wire harness from the external interfering member. Also, if the tape-support portion of the main body casing is formed into the L-shaped cross section, it is possible to secure the tape-support portion of the main body casing to the wire harness regardless of any diameter of the wire harness.

The protector of the present invention is preferably used near a sharp external interfering member disposed outside the tape-support portion of the lid when the protector is attached to the wire harness and is mounted on the motor vehicle.

As described above, according to the present invention, since the tape-support portions are provided on not only the main body casing into which the wire harness is inserted but only the lid for closing the opening in the main body casing, it is possible for the tape-support portion of the lid to protect the wire harness from the external interfering member disposed above the tape-wrapping position. Accordingly, since it is possible to protect the wire harness from the external interfering member even at the tape-wrapping position where the protector is attached to the wire harness, it is possible to shorten the main body casing and lid of the protector to be smaller than an area required for protecting the wire harness, to downsize the protector, and to lower a cost in production.

Since the tape-support portion of the lid is flexible or it protrudes from the lid through the thin hinge portion, it is possible to bring the tape-support portion of the lid into contact with the outer peripheral surface of the wire harness and to secure the portion to the wire harness by the tape-wrapping manner regardless of any diameter of the wire harness.

DETAILED DESCRIPTION OF THE PREFERRED EMBODIMENT

Embodiments of a protector for a wire harness in accordance with the present invention will be described below by referring to the drawings.

FIGS. 1 to 8 show a first embodiment of a protector for a wire harness in accordance with the present invention.

Figure 1:
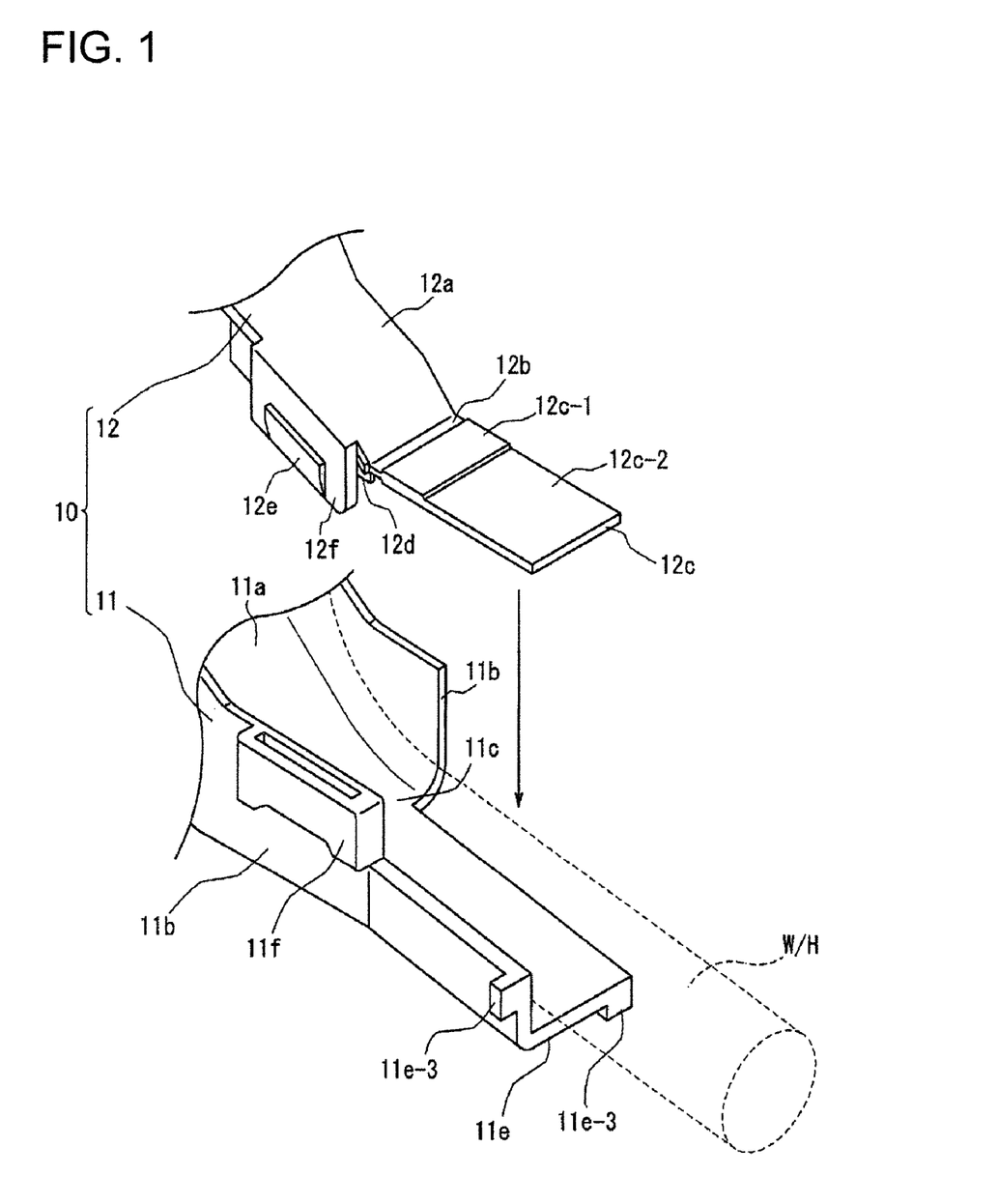
FIG. 1 is a perspective view of a main part of an embodiment of a protector for a wire harness in accordance with the present invention.

A wire harness W/H to be arranged in a motor vehicle is inserted into a protector 10 for the wire harness. The protector 10 includes a main body casing 11 having a U-shaped cross section, and a lid 12 that closes an upper opening in the main body casing 11. In the first embodiment, the main body casing 11 and lid 12 are resin products made of nylon.

Figure 2A:
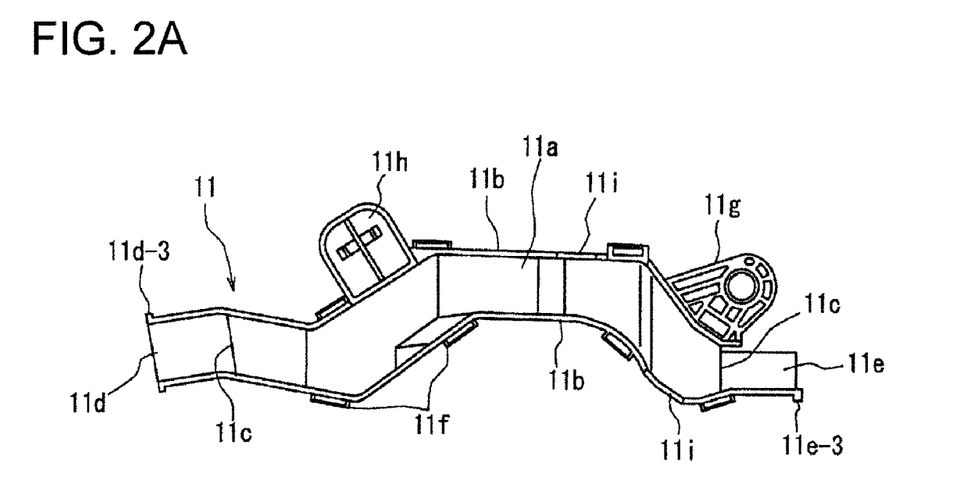
FIG. 2A is a plan view of a main body casing shown in FIG. 1.
Figure 2B:
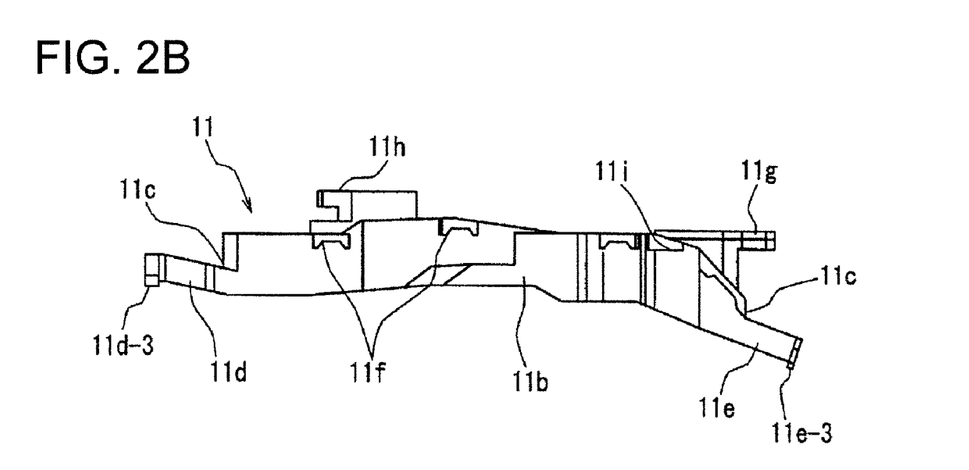
FIG. 2B is a front elevation view of the main body casing shown in FIG. 2A.

The main body casing 11 includes a bottom wall 11a that is bent in upper and lower directions and right and left directions along an arrangement path of the wire harness W/H, and side walls 11b that stand up from opposite side edges in a width direction perpendicular to a longitudinal direction of the bottom wall 11a. The main body casing 11 has a U-shaped cross section. Opposite ends of the main body casing 11 in the longitudinal direction define inlet and outlet portions 11c for the wire harness W/H.

End portions that protrude from the opposite end edges of the inlet and outlet portions 11c for the wire harness W/H define tape-support portions 11d and 11e. A tape T is wound around the tape-support portions 11d and 11e together with the wire harness W/H inserted in the main body casing 11.

The protector 10 is secured to the wire harness W/H at the opposite ends by a tape-wrapping manner.

The tape-support portion 11d provided on one of inlet and outlet portions 11c (a left side portion in FIG. 2) from which the wire harness W/H at an upstream side is drawn out includes a bottom wall 11d-1 and side walls 11d-2 (FIG. 4B) that stand up from opposite end edges of the bottom wall 11d-1. The tape support portion 11d has a U-shaped cross section. The bottom wall 11d-1 and side walls 11d-2 are continued to the bottom wall 11a and side walls 11b, respectively. The side walls 11d-2 of the tape-support portion 11d is lower than the side walls 11b into which the wire harness W/H is inserted. As shown in FIG. 4B, the tape-support portion 11d is secured to the wire harness W/H by the tape-wrapping manner.

Figure 5A:
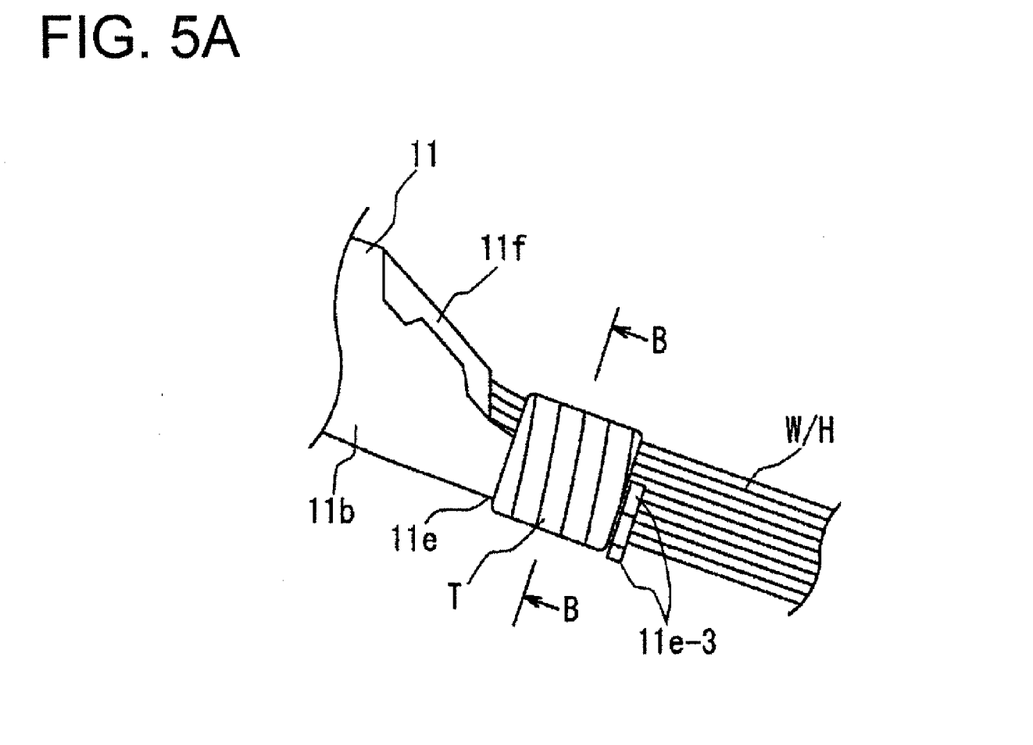
FIG. 5A is a front elevation view of a tape-support portion of the main body casing, illustrating the tape-support portion being secured to the wire harness by a tap-wrapping manner.
Figure 5B:
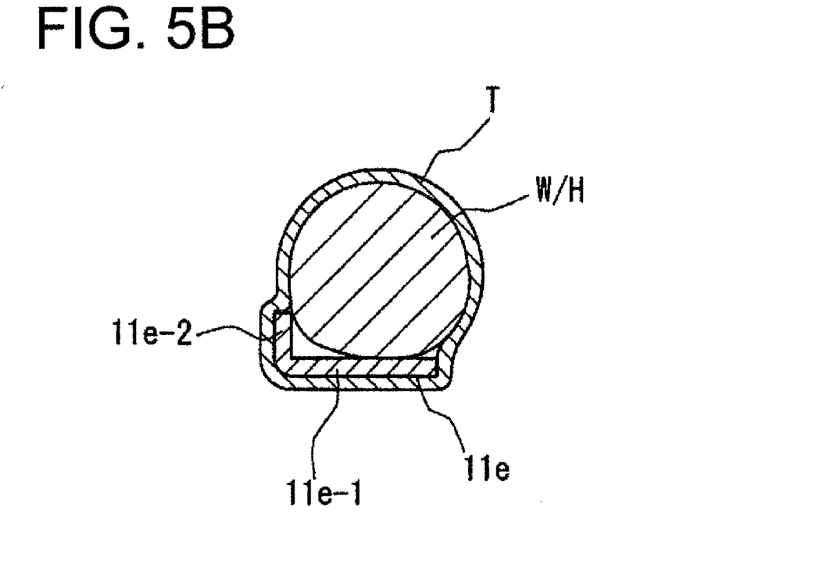
FIG. 5B is a cross section view of the tape-support portion taken along lines B-B in FIG. 5A.

On the other hand, the tape-support portion 11e provided in the other inlet and outlet portion 11c (a right side portion in FIG. 2) from which the wire harness W/H at a downstream side is drawn out includes a bottom wall 11e-1 (FIG. 5B) that protrudes obliquely downward to a distal end, and a side wall 11e-2 (FIG. 5B) that stands up from a side edge of the bottom wall 11e-1. The tape-support portion 11e has an L-shaped cross section. The bottom wall 11e-1 and side wall 11e-2 are continued to the bottom wall 11a and side wall 11b, respectively. The side wall 11e-2 of the tape-support portion 11e is lower than the side wall 11b into which the wire harness W/H is inserted. As shown in FIG. 5B, the wire harness W/H is secured to the tape-support portion 11e by the tape-wrapping manner.

Ribs 11d-3 and 11e-3 project from distal end outer surfaces of the tape-support portions 11d and 11e. The ribs 11d-3 and 11e-3 can prevent displacement between the tape-support portions and the tape T wound around the wire harness W/H.

The side walls 11b of the main body casing 11 are provided on given positions with a lock frame 11f to be locked on the lid 12, a bracket 11g to be attached to a vehicle body, and a vehicle body engagement portion 11h with a clip to be engaged with the vehicle body side.

Further, the side walls 11b of the main body casing 11 are provided in given positions on the upper end edge with recesses 11i. Each of the recesses 11i defines an outlet for a branch line branched from the wire harness W/H inserted in the main body casing 11.

Figure 3A:
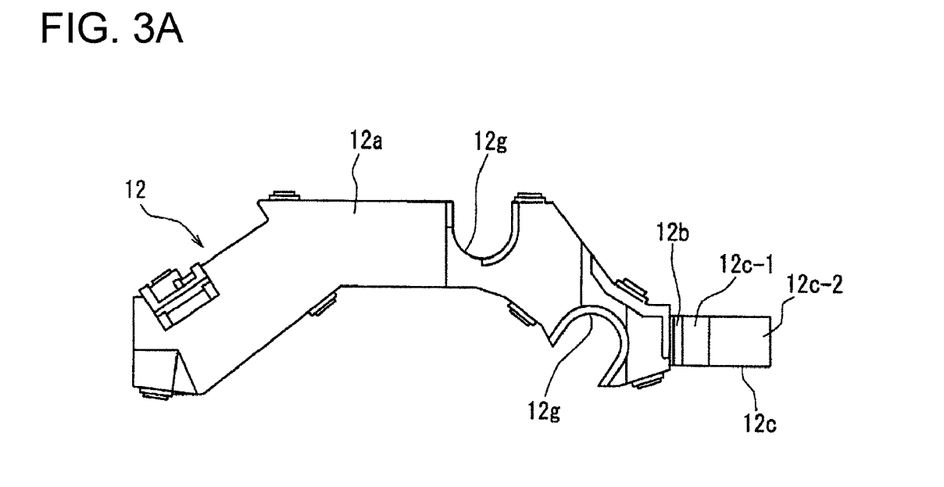
FIG. 3A is a plan view of a lid shown in FIG. 1.
Figure 3B:
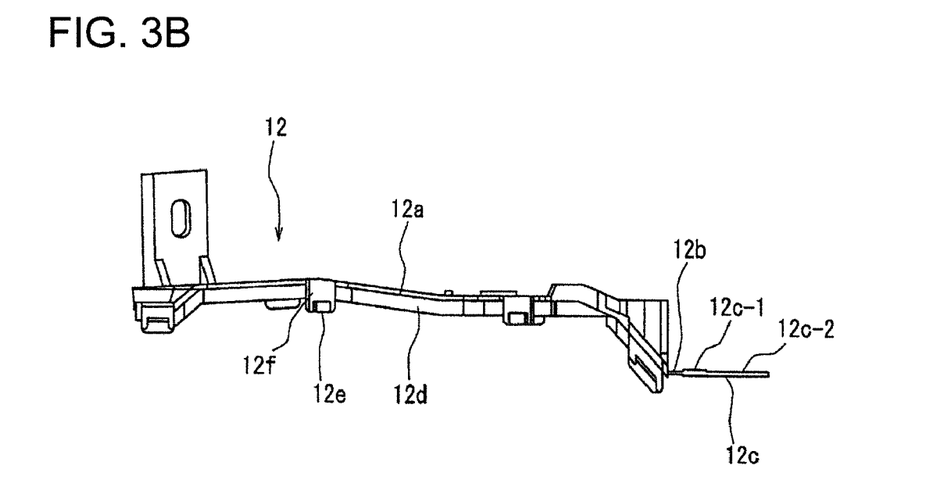
FIG. 3B is a front elevation view of the lid shown in FIG. 3A.

On the other hand, an upper wall 12a of the lid 12 to be mounted on the main body casing 11 has a substantially same configuration as the bottom wall 11a of the main body casing 11. A tape-support tongue piece 12c (a tape-support portion) having a rectangular flat plate-like configuration protrudes through a thin hinge portion 12b from an end (a right side end in FIG. 3) in the longitudinal direction. The tape-support tongue piece 12c includes a reinforcement thick portion 12c-1 that has a large thickness at a proximal end side continued to the thin hinge portion 12b, and a thin flexible portion 12c-2 that has a small thickness at a distal end side. The upper wall 12a of the lid 12 slants down at an end side provided with the tape-support tongue piece 12c. The tape-support tongue piece 12c is bent at the thin hinge portion 12b to extend in a horizontal direction.

Figure 8:
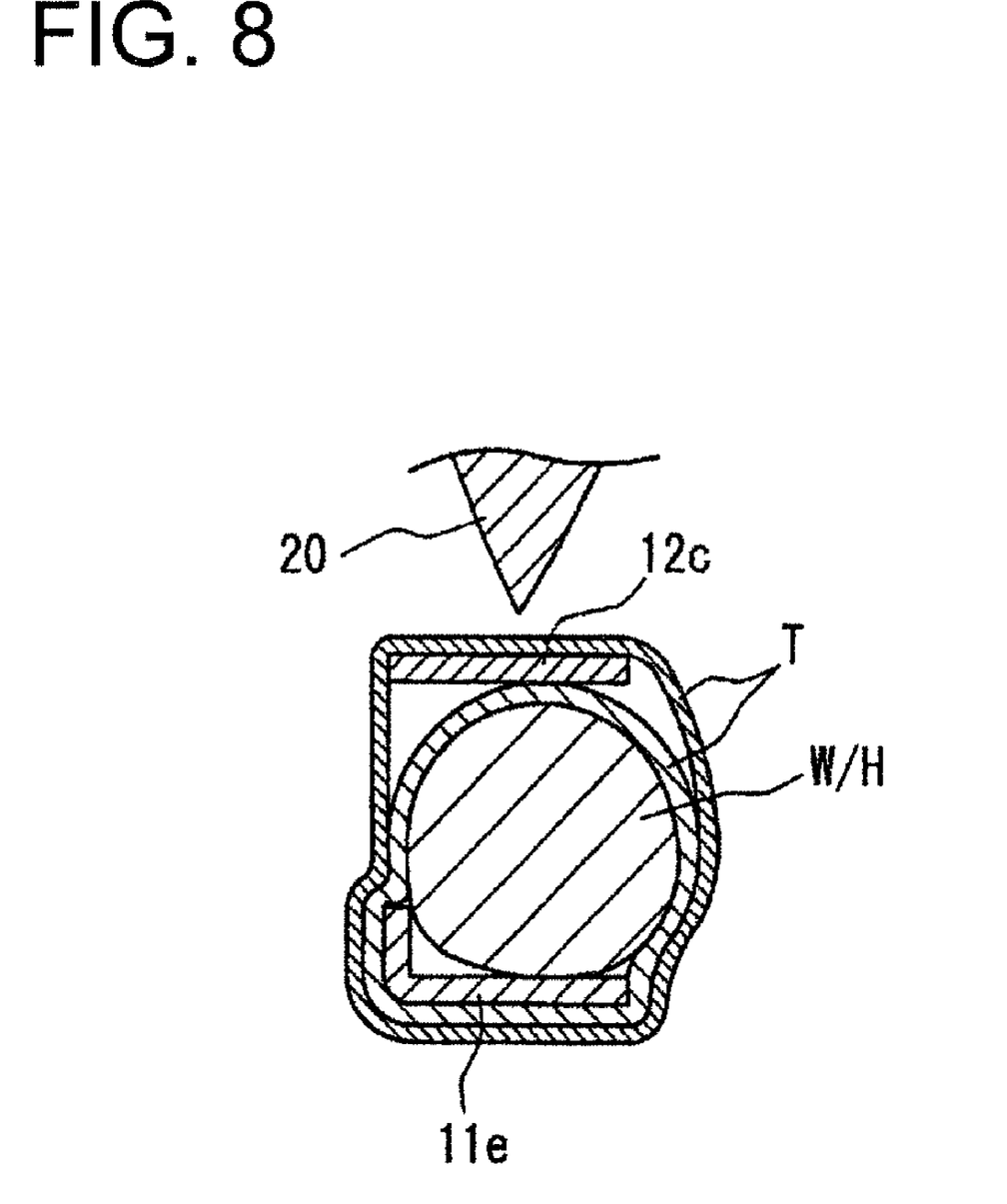
FIG. 8 is a cross section view similar to FIG. 7B, illustrating a relationship in position between the wire harness and an external interfering member when the wire harness is installed in a motor vehicle.

The tape-support tongue piece 12c of the lid 12 is opposed to the tape-support portion 11e of the main body casing 11 in the vertical direction, when the lid 12 is mounted on the main body casing 11. Further, when the protector 10 is mounted on an engine room in the motor vehicle, as shown in FIG. 8, a sharp outer interfering member 20 is disposed outside the tape-support tongue piece 12c.

Side walls 12d extend downward from the opposite sides of the upper wall 12a in the width direction. The lock piece 12f provided with a lock pawl 12e on a distal end protrudes from a given position on an end edge in the width direction of the upper wall 12a. When the lock pawl 12f is inserted into the lock frame 11f of the main body casing 11, the main body casing 11 and lid 12 are interlocked. Thus, a length of the lid 12 is designed so that the longitudinal opposite ends of the upper wall 12a of the lid 12 do not project from the upper position of the tape-support portions 11d and 11e, when the main body casing 11 and lid 12 are interlocked.

Also, the upper wall 12a of the lid 12 is provided with recesses 12g for drawing the branch lines to be opposed to the recesses 11i of the main body casing 11. The recesses 11i and 12g define outlets for drawing branch lines.

Next, a method for attaching the protector 10 to the wire harness W/H will be described below.

Figure 4A:
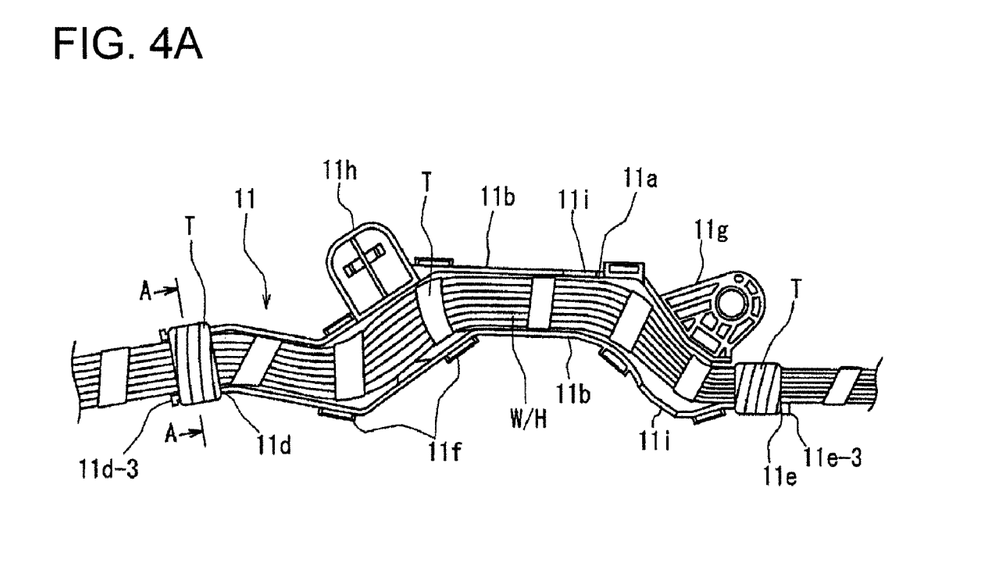
FIG. 4A is a plan view of the main body casing similar to FIG. 2A, illustrating the main body casing into which a wire harness is inserted.
Figure 4B:
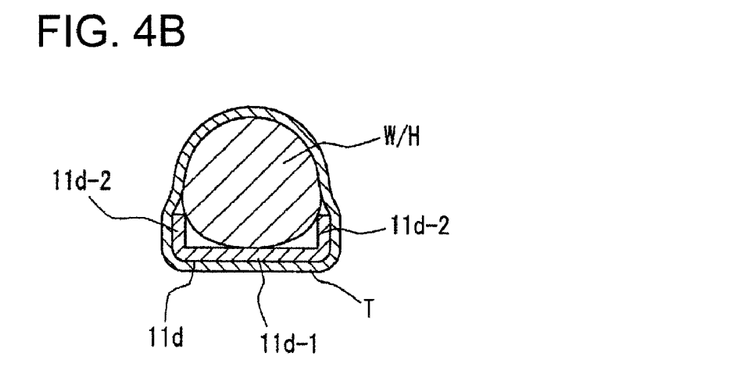
FIG. 4B is a cross section view of the main body casing taken along lines A-A in FIG. 4A.

Firstly, as shown in FIG. 4A, a wire harness W/H that bundles a plurality of electrical wires by roughly winding them by a tape T is inserted into the main body casing 11. The main body casing 11 is secured to the wire harness W/H at the tape-support portions 11d and 11e on the opposite ends of the casing 11.

In more detail, as shown in FIG. 4B, the one tape-support portion 11d having the U-shaped cross section is secured to the wire harness W/H by the tape-wrapping manner. As shown in FIG. 5B, the other tape-support portion 11e having the L-shaped cross section is secured to the wire harness W/H by the tape-wrapping manner.

Figure 6A:
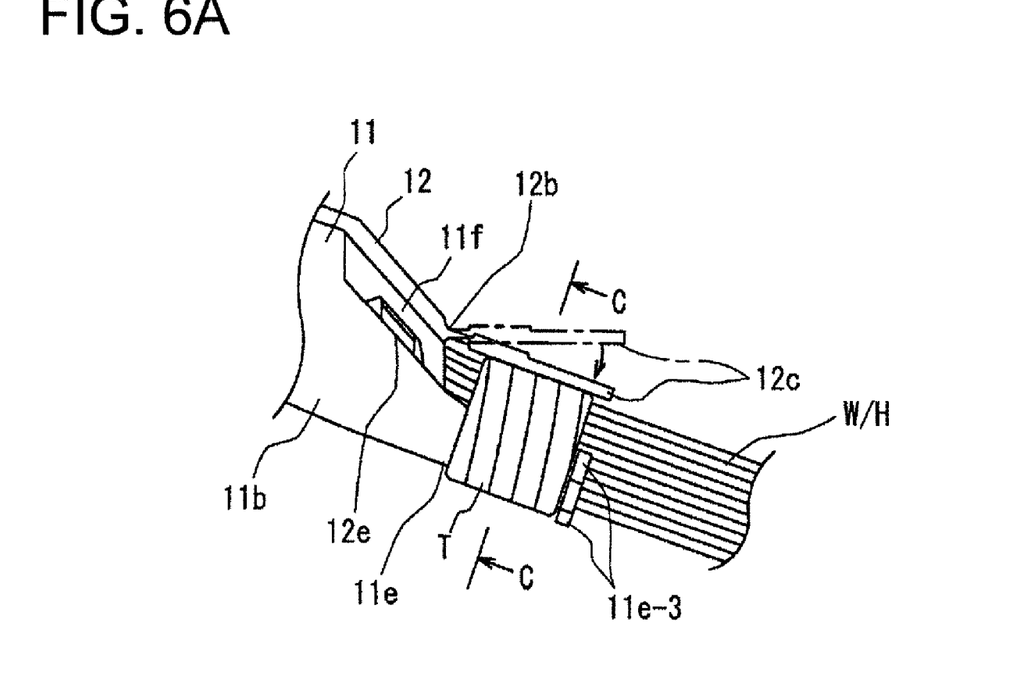
FIG. 6A is a front elevation view similar to FIG. 5A, illustrating a tape-support tongue piece of the lid being disposed on the wire harness.
Figure 6B:
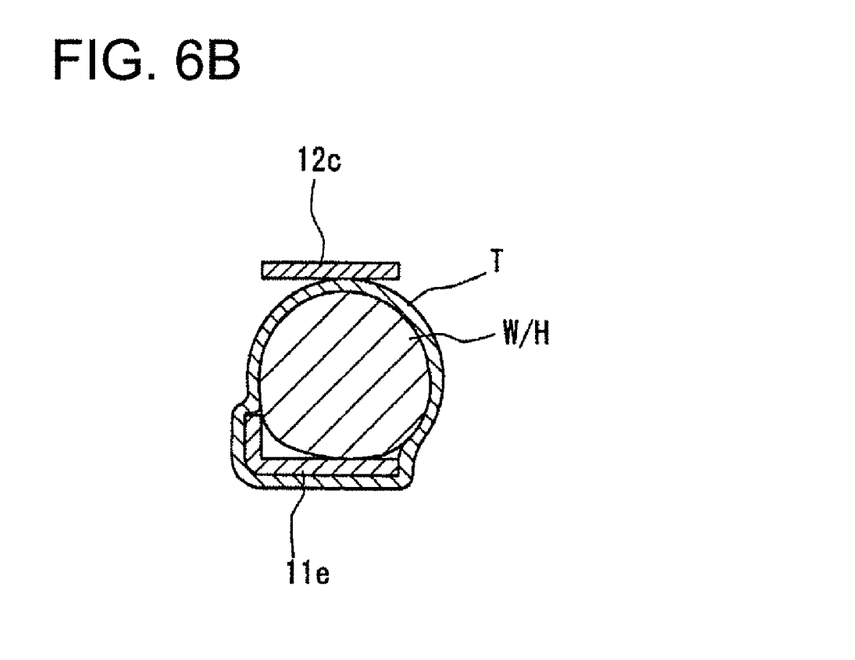
FIG. 6B is a cross section view of the tape-support tongue piece taken along lines C-C in FIG. 6A.

Secondly, the main body casing 11 and lid 12 are interlocked. Then, the tape-support tongue piece 12c of the lid 12c is opposed to the securing part between the tape-support portion 11e of the main body casing 11 and the wire harness W/H in the vertical direction. At this time, since the tape-support tongue piece 12c of the lid 12 extends horizontally, as shown in FIG. 6A, the tape-support tongue piece 12c is inclined downward about the thin hinge portion 12b to bring the tape-support tongue piece 12b into contact with an outer peripheral surface of the wire harness W/H.

Figure 7A:
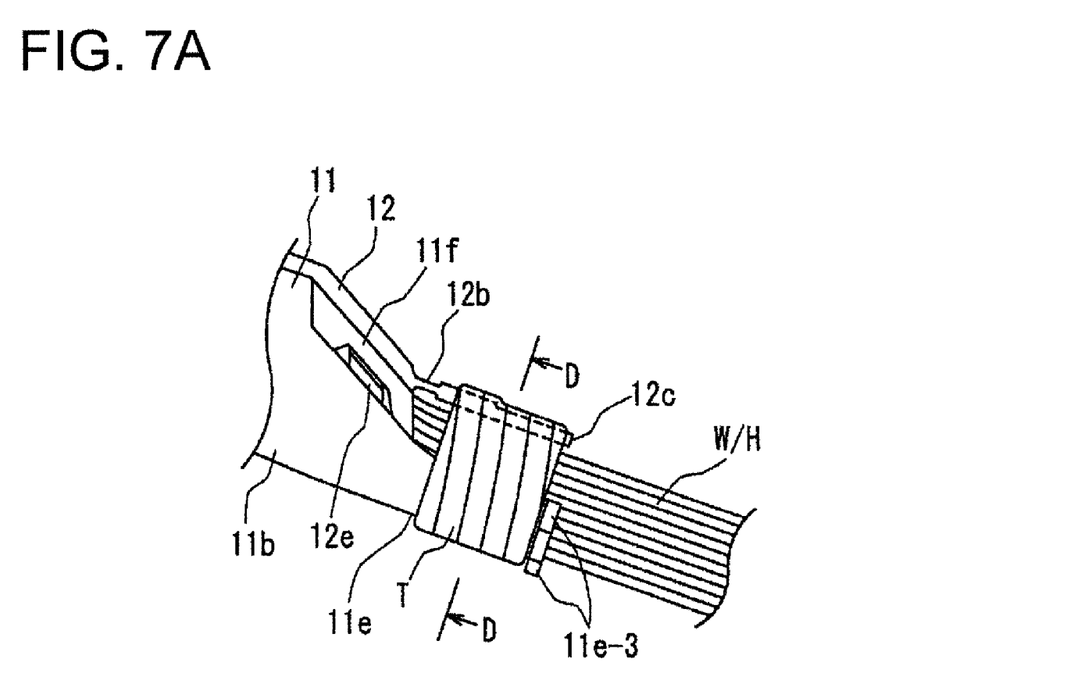
FIG. 7A is a front elevation view similar to FIG. 6A, illustrating the tape-support tongue piece of the lid being secured to the wire harness by the tape-wrapping manner.
Figure 7B:
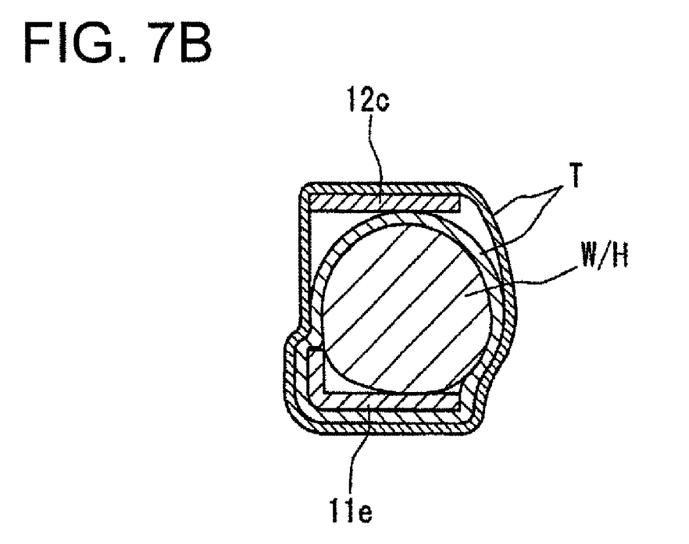
FIG. 7B is a cross section view similar to FIG. 6B taken along lines D-D in FIG. 6A.

Finally, as shown in FIGS. 7A and 7B, the tape T is wound around the tape-wrapping and securing part between the tape-support portion 11e of the main body casing 11 and the wire harness W/H, and the tape-support tongue piece 12c of the lid 12. On the tape-wrapping portion on the wire harness W/H, the tape-support portion 11e of the main body casing 11 is secured to the lower side of the wire harness W/H while the tape-support tongue piece 12c of the lid 12 is secured to the upper side of the wire harness W/H.

According to the above construction, in order to fixing the wire harness W/H and the protector to each other, since the tape-support portion 11e is provided on the main body casing into which the wire harness W/H is inserted and the tape-support tongue piece 12e is provided on the lid 12 to be mounted on the main body casing 11, the tape-support tongue piece 12c of the lid 12 can protect the wire harness W/H from the external interfering member 20 disposed above the tape-wrapping position.

Thus, since it is possible to protect the wire harness W/H from the external interfering member 20 even at the tape-wrapping position where the wire harness W/H and the protector 10 are secured to each other, it is possible to set a protecting area for the wire harness W/H to be shorter except the tape-wrapping portion between the main body casing 11 and the lid 12 of the protector 10, it is possible to downsize the protector 10, and it is possible to lower a cost in production. Since the protector 10 is downsized, it is possible to facilitate to contain the protector in a container that carries the protector to a working place for attaching the protector to the wire harness.

Since the tape-support tongue piece 12c of the lid 12 protrudes through the thin hinge portion 12b from the lid 12 and the tape-support tongue piece 12c is flexible, it can slant at a given angle to a side of the wire harness W/H drawn out of the main body casing 11. The tape-support tongue piece 12c can contact the outer peripheral surface of the wire harness W/H regardless of a diameter of the wire harness W/H.

Figure 9A:
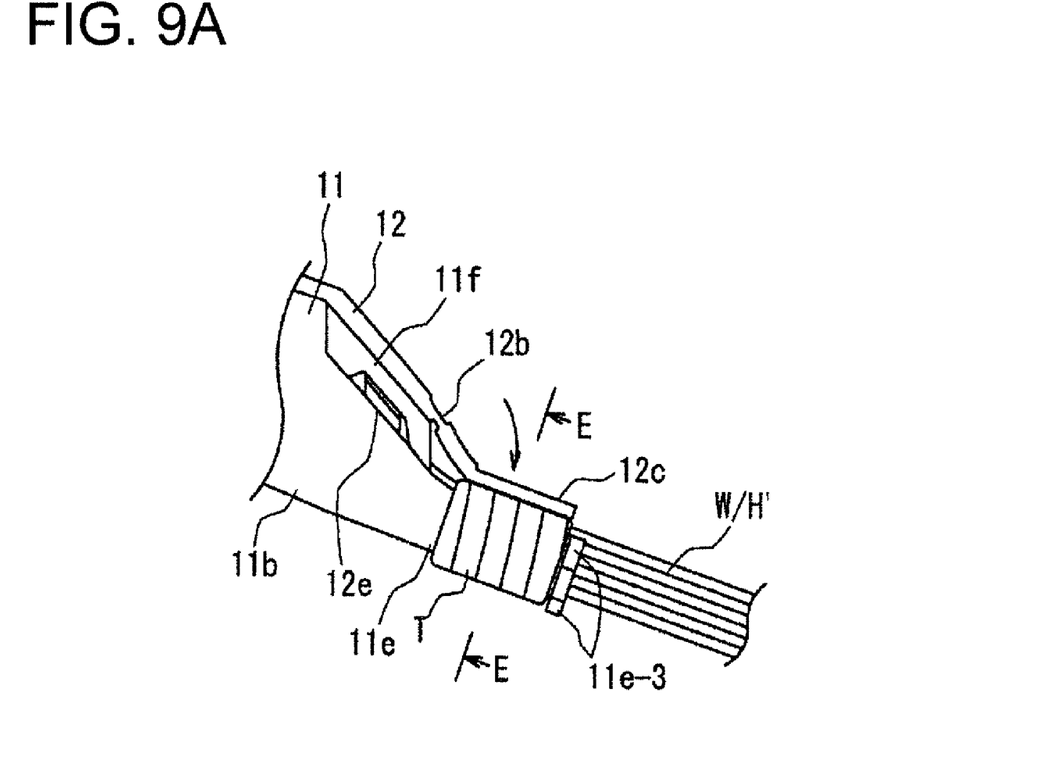
FIG. 9A is a front elevation view of a modified first embodiment of the protector in accordance with the present invention, illustrating the tape-support tongue piece of the lid being disposed on a wire harness having a small diameter.
Figure 9B:
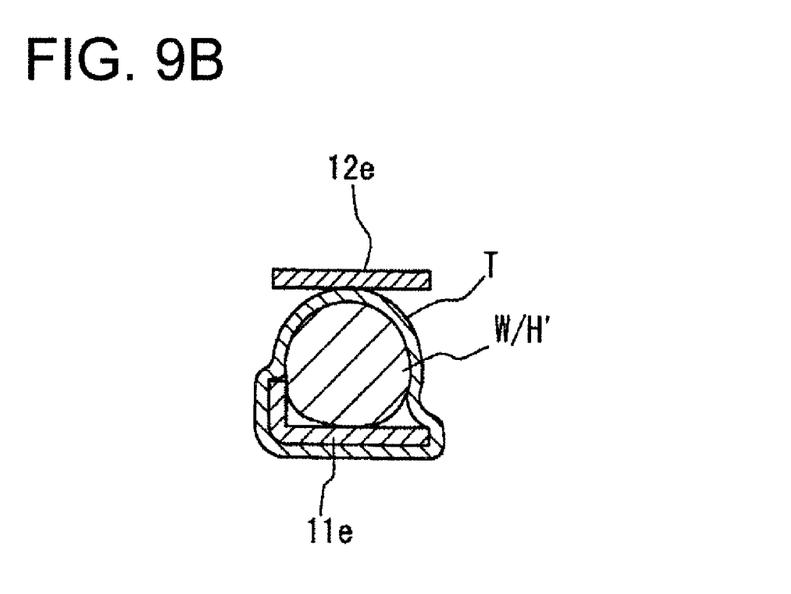
FIG. 9B is a cross section view similar to FIG. 6B taken along lines E-E in FIG. 9A.

Accordingly, as describe above in the present embodiment, it is possible to secure the tape-support tongue piece 12c of the lid 12 to the wire harness W/H having not only a large diameter but also a small diameter by the tape-wrapping manner.

Since diameters of the wire harnesses W/H at the upstream side portion passing through the tape-support portion 11d of the main body casing 11 are substantially not different from one another on account of vehicle type and grade, the tape-support portion 11d is formed into a U-shaped cross section and a wire harness W/H having a given diameter is secured to the tape-support portion 11d by the tape-wrapping manner.

On the other hand, in the case where the number of the branch lines branched in the protector 10 is changed on account of the vehicle type and grade, the diameters of the wire harnesses W/H at the portion (a downstream side) passing the tape-support portion 11e are different from one another. Accordingly, the tape-support portion 11e is formed into an L-shaped cross section so that the tape-support portion 11e can be secured to any different kinds of wire harnesses W/H by the tape-wrapping manner.

Although the tape-support tongue piece 12c of the lid 12 is provided on only an end of the lid 12 in the longitudinal direction in the above embodiment, the tape-support tongue piece 12c may be provided on each of the opposite ends of the lid 12.

Although the lid 12 is separated from the main body casing 11 in the above embodiment, they may be integrated through a hinge portion with each other and may be made of polypropylene.

Further, after the wire harness W/H is inserted into the main body casing 11 and the lid 12 is mounted on the main body casing 11, the wire harness W/H is disposed between the tape-support portion 11d of the main body casing 11 and the tape-support tongue piece 12c of the lid 12 and the tape-wrapping process may be carried out. In this case, the tape-wrapping process can be performed in a single time.

Figure 10A:
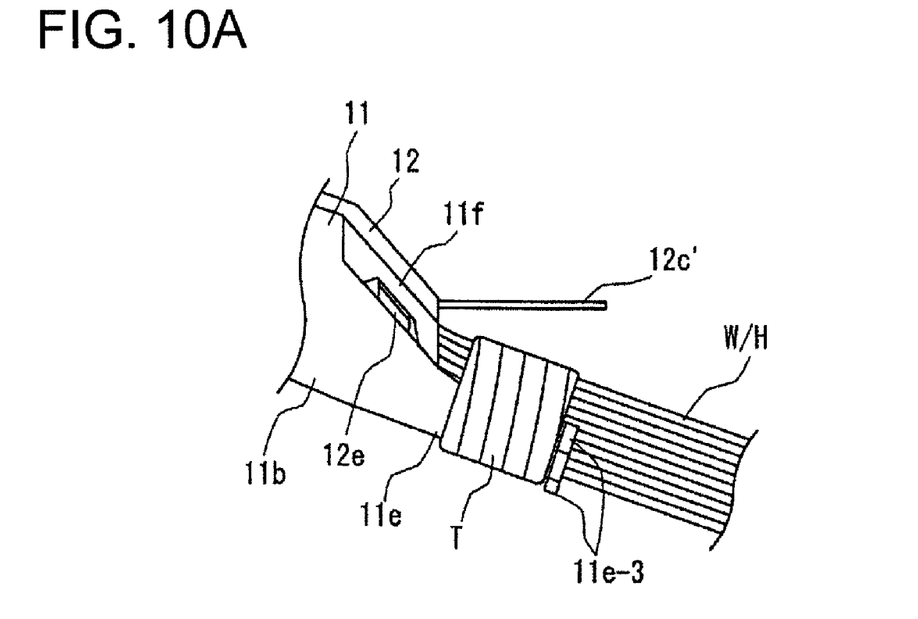
FIGS. 10A and 10B are front elevation views of a second embodiment of the protector in accordance with the present invention.
Figure 10B:
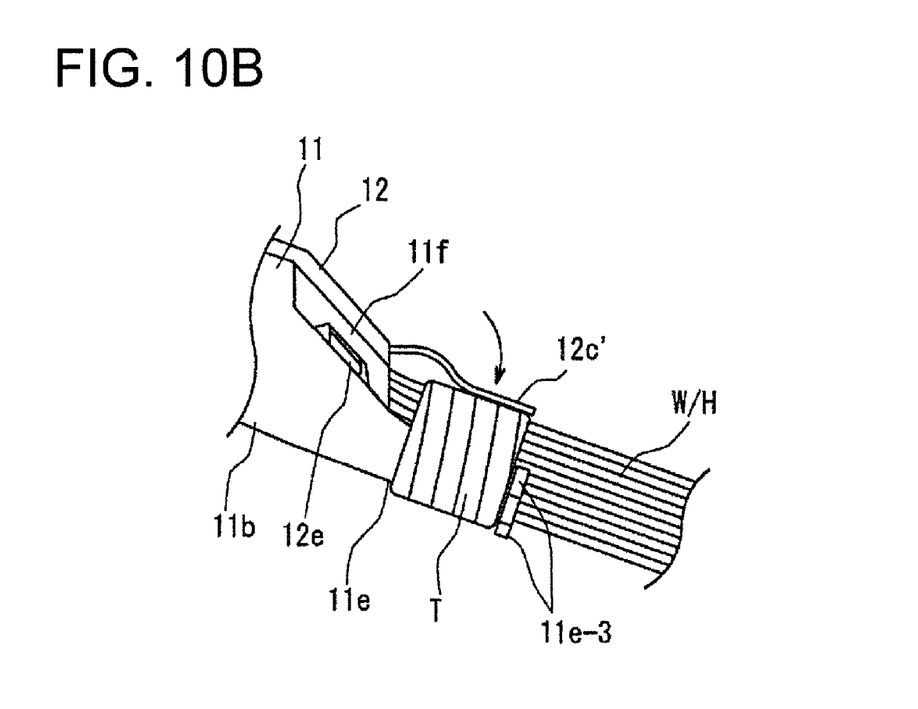

FIGS. 10A and 10B show a second embodiment of a protector for a wire harness in accordance with the present invention.

In the second embodiment, a tape-support tongue piece 12c' of the lid 12 is different from that in the first embodiment. A thin hinge portion is not provided between the tape-support tongue piece 12c' and the lid 12 and the tape-support tongue piece 12c' is thin and flexible as a whole.

Accordingly, as shown in FIG. 10B, the tape-support tongue piece 12c can be contacted with the outer peripheral surface of the wire harness W/H while deflecting the tape-support tongue piece 12c.

Since the other constructions and operational effects in the second embodiment are the same as those in the first embodiment, explanations of them are omitted by giving the same signs to the same elements or portions.

Figure 11:
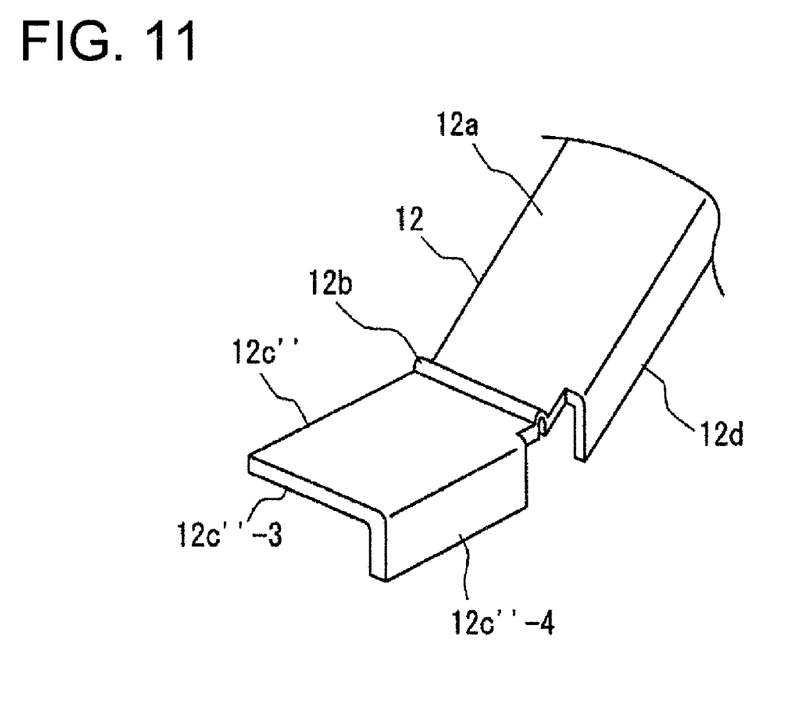
FIG. 11 is a perspective view of a third embodiment of the lid of the protector in accordance with the present invention.
Figure 12:
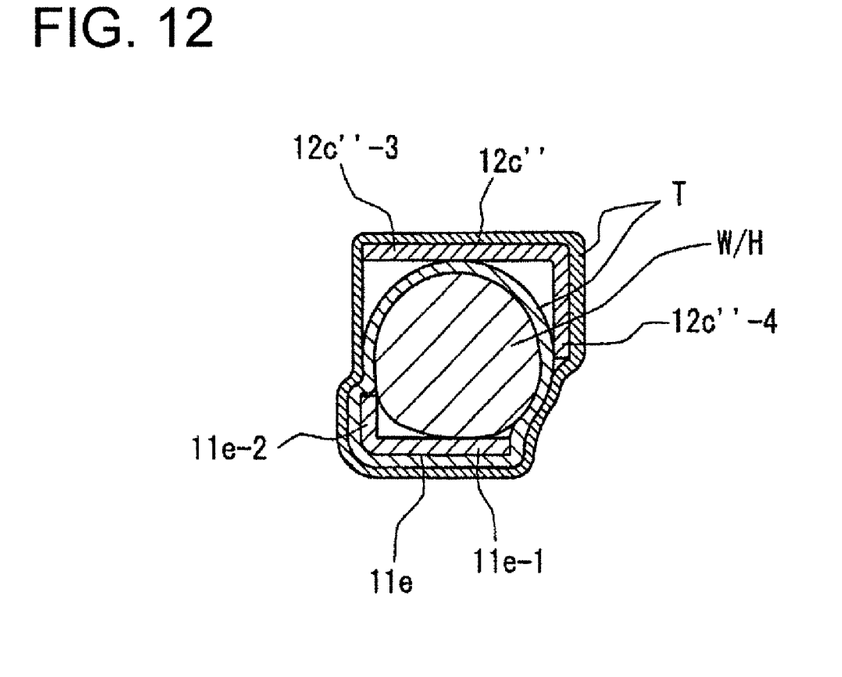
FIG. 12 is a cross section view of the protector in the third embodiment, illustrating the tape-support portion of the main body casing and the tape-support tongue piece of the lid being secured to the wire harness by the tape-wrapping manner.

FIGS. 11 and 12 show a third embodiment of a protector for a wire harness in accordance with the present invention.

In the third embodiment, the tape-support portion 12c" of the lid 12 is different from the tape-support portion 12c in the first embodiment. The tape-support portion 12c" includes an upper wall 12c"-3, a side wall 12c"-4 that extends downward from an end edge of the upper wall 12c"-3 in the width direction. The tape-support portion 12c" has an L-shaped cross section.

The upper wall 12c"-3 of the tape-support portion 12c" is continued through the thin hinge portion 12b to the upper wall 12a. The side wall 12c"-4 is spaced apart from the side wall 12d so that the side wall 12c"-4 does not interfere with the side wall 12d when the side wall 12c"-4 is bent at the thin hinge portion 12b.

The side wall 12c"-4 is provided at a side opposite from the side wall 11e-2 of the tape-support portion 11e of the main body casing 11.

According to the above construction, as shown in FIG. 12, it is possible to protect a substantially whole outer peripheral surface of the wire harness W/H from the external interfering member by the tape-support portion 11e of the main body casing 11 and the tape-support portion 12c" of the lid 12.

Figure 13:
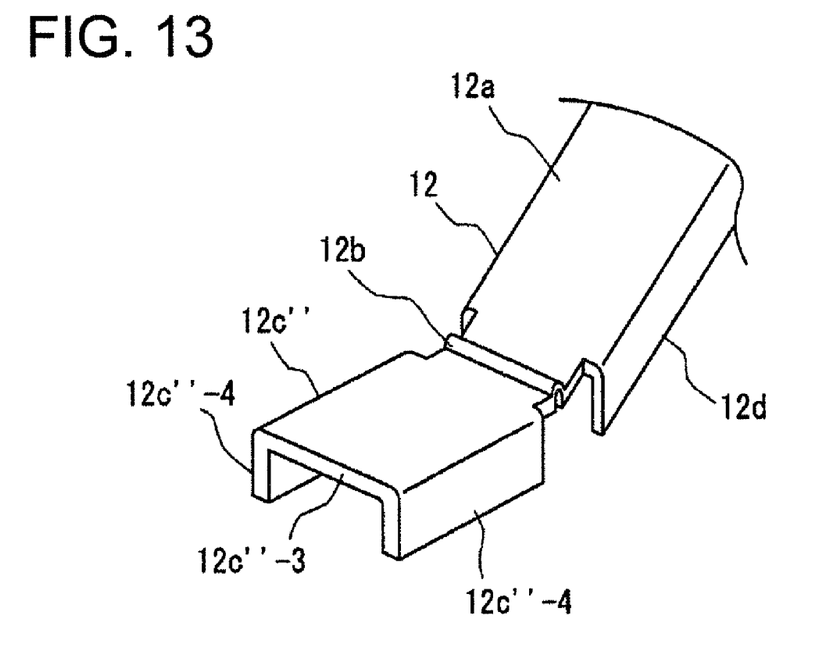
FIG. 13 is a perspective view of a first modified lid in the third embodiment.
Figure 14:
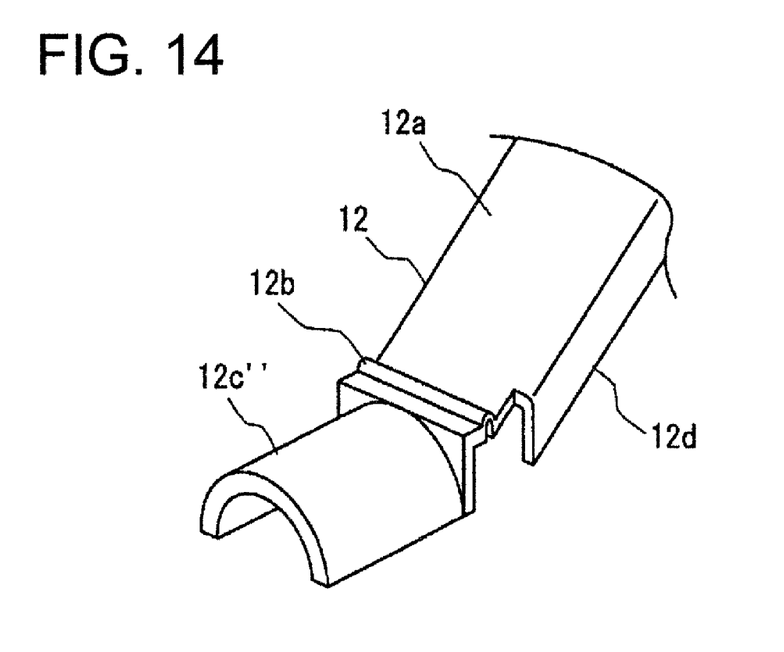
FIG. 14 is a perspective view of a second modified lid in the third embodiment.

Also, the tape-support portion 12c" may be formed so that the side walls 12c"-4 extend downward from opposite sides of the upper wall 12c"-3 to define a slant U-shaped cross section, as shown in FIG. 13. Alternatively, as shown in FIG. 14, the tape-support portion 12c" may be formed into a half annular configuration having an arcuate cross section.

Since the other constructions and operational effects in the third embodiment are the same as those in the first embodiment, explanations of them are omitted by giving the same signs to the same elements or portions.

The invention claimed is:

1. A protector-attaching structure in which a wire harness to be arranged in a motor vehicle is inserted into a protector comprising a main body casing having a U-shaped cross section and a lid for closing an opening in said main body casing;

said main body casing of said protector being provided on longitudinal opposite ends with inlet and outlet portions for the wire harness, said inlet and outlet portions being adapted to define tape-support portions that receive the wire harness and are wound by a first tape to be secured to the wire harness;

said lid being provided with a wall and a tape-support tongue piece joined to the wall by a thin hinge portion so that the tape-support tongue piece protrudes from a longitudinal end of the wall, said tape-support tongue piece of said lid being inclined about said thin hinge portion so that said tape-support tongue piece of said lid can contact an outer peripheral surface of the wire harness, said tape-support tongue piece of said lid being provided on a proximal end part coupled to said thin hinge portion with a reinforcement thick portion and on a distal end part spaced from the thin hinge portion with a flexible thin portion;

said wire harness being arranged along said tape-support portions of said main body casing and being wrapped by the first tape, said tape-support tongue piece of said lid being inclined onto and being contacted with an outer peripheral surface of the first tape wound around the wire harness, a second tape being wound around the outer peripheral surface of the first tape and around an outer peripheral surface of said tape-support tongue piece of said lid to secure said tape-support portions of said main body casing and said lid to the wire harness.

2. A protector-attaching structure for a wire harness according to claim 1, wherein said tape-support tongue piece has a flat plate-like cross section, a U-shaped cross section, or an arcuate cross section in a direction perpendicular to the longitudinal direction.

3. A protector-attaching structure for a wire harness according to claim 1, wherein a sharp external interfering member is disposed outside said tape-support tongue piece of said lid when said protector attached to the wire harness is mounted on the motor vehicle.

* * * * *